(12) United States Patent
Morimoto et al.

(10) Patent No.: US 10,753,008 B2
(45) Date of Patent: Aug. 25, 2020

(54) NICKEL PLATED COATING AND METHOD OF MANUFACTURING THE SAME

(71) Applicant: TOYODA GOSEI CO., LTD., Kiyosu-shi, Aichi-ken (JP)

(72) Inventors: Kenjiro Morimoto, Kiyosu (JP); Junji Yoshida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/780,266

(22) PCT Filed: Dec. 7, 2016

(86) PCT No.: PCT/JP2016/086433
§ 371 (c)(1),
(2) Date: May 31, 2018

(87) PCT Pub. No.: WO2017/145492
PCT Pub. Date: Aug. 31, 2017

(65) Prior Publication Data
US 2018/0347060 A1     Dec. 6, 2018

(30) Foreign Application Priority Data

Feb. 26, 2016 (JP) ................................. 2016-035234

(51) Int. Cl.
*B32B 15/01* (2006.01)
*C25D 21/12* (2006.01)
(Continued)

(52) U.S. Cl.
CPC ............... *C25D 5/14* (2013.01); *B32B 15/01* (2013.01); *C25D 3/06* (2013.01); *C25D 3/14* (2013.01);
(Continued)

(58) Field of Classification Search
None
See application file for complete search history.

(56) References Cited

U.S. PATENT DOCUMENTS

| | | | | |
|---|---|---|---|---|
| 4,439,284 A * | 3/1984 | Walter | ................... | C25D 21/10 |
| | | | | 205/148 |
| 6,468,672 B1 * | 10/2002 | Donovan, III | ........... | C25D 5/14 |
| | | | | 205/169 |

(Continued)

FOREIGN PATENT DOCUMENTS

| | | |
|---|---|---|
| JP | 2004-225129 A | 8/2004 |
| JP | 2005-272858 A | 10/2005 |
| JP | 2009-074170 A | 4/2009 |

OTHER PUBLICATIONS

International Preliminary Report on Patentability of the International Searching Authority dated Sep. 7, 2018 for the corresponding international application No. PCT/JP2016/086433 (and English translation).

(Continued)

*Primary Examiner* — Xiaobei Wang
(74) *Attorney, Agent, or Firm* — Posz Law Group, PLC

(57) ABSTRACT

In a method of manufacturing a Ni plated coating that includes at least one Ni plated layer, an agitation intensity of a plating bath is changed while the Ni plated layer is being electrodeposited to change potential of the deposited Ni plated layer in a deposition depth direction. A Ni plated coating including a D-Ni plated layer and a B-Ni plated layer adjoining the D-Ni plated layer has, other than an interface voltage changing region at an interface between the D-Ni plated layer and the B-Ni plated layer, an in-layer voltage changing region in which, in the D-Ni plated layer or in the B-Ni plated layer, potential is changed in a deposition depth direction at an average rate of 1 mV/0.1 μm or greater.

5 Claims, 7 Drawing Sheets

(51) Int. Cl.
*C25D 21/10* (2006.01)
*C25D 3/56* (2006.01)
*C25D 5/14* (2006.01)
*C25D 3/18* (2006.01)
*C25D 15/00* (2006.01)
*C25D 3/16* (2006.01)
*C25D 3/06* (2006.01)
*C25D 3/14* (2006.01)
*C25D 11/38* (2006.01)
*C25D 3/12* (2006.01)

(52) U.S. Cl.
CPC ............... *C25D 3/16* (2013.01); *C25D 3/18* (2013.01); *C25D 3/562* (2013.01); *C25D 11/38* (2013.01); *C25D 15/00* (2013.01); *C25D 21/10* (2013.01); *C25D 21/12* (2013.01)

(56) References Cited

U.S. PATENT DOCUMENTS

| | | | |
|---|---|---|---|
| 2004/0027715 A1* | 2/2004 | Hixson-Goldsmith | C25D 5/14 360/110 |
| 2008/0067072 A1* | 3/2008 | Kim | C25D 3/56 205/96 |
| 2008/0173548 A1* | 7/2008 | Macary | C25D 5/022 205/178 |
| 2009/0130425 A1* | 5/2009 | Whitaker | A63B 49/10 428/312.8 |
| 2009/0317556 A1* | 12/2009 | Macary | C23C 18/1653 427/438 |
| 2011/0117380 A1 | 5/2011 | Sugawara et al. | |
| 2011/0132766 A1* | 6/2011 | Middeke | C25D 15/02 205/109 |
| 2012/0088118 A1* | 4/2012 | Lomasney | C25D 5/10 428/615 |
| 2014/0284218 A1 | 9/2014 | Sugawara et al. | |

OTHER PUBLICATIONS

International Search Report of the International Searching Authority dated Mar. 7, 2017 for the corresponding international application No. PCT/JP2016/086433 (and English translation).

* cited by examiner

F I G. 1
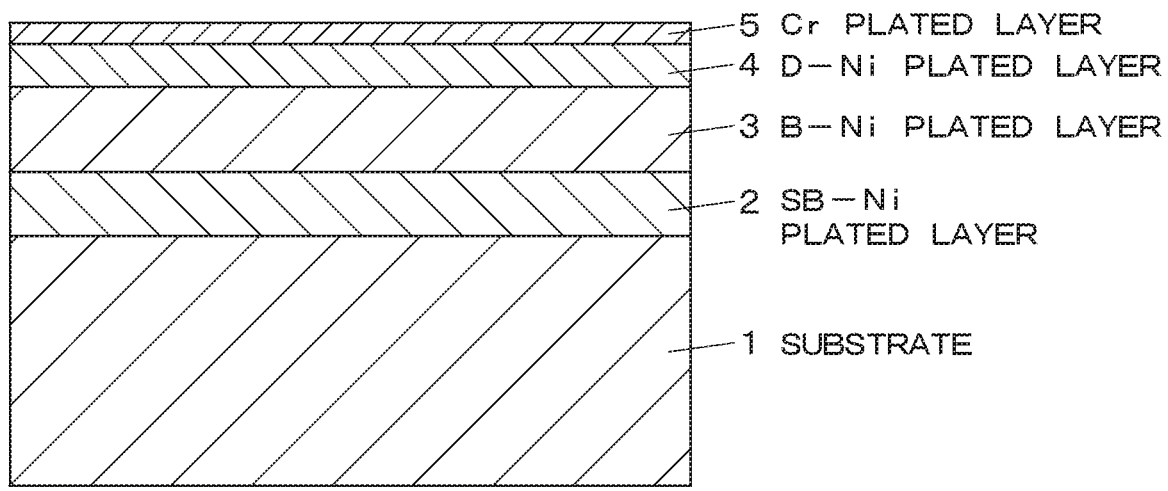

F I G. 2
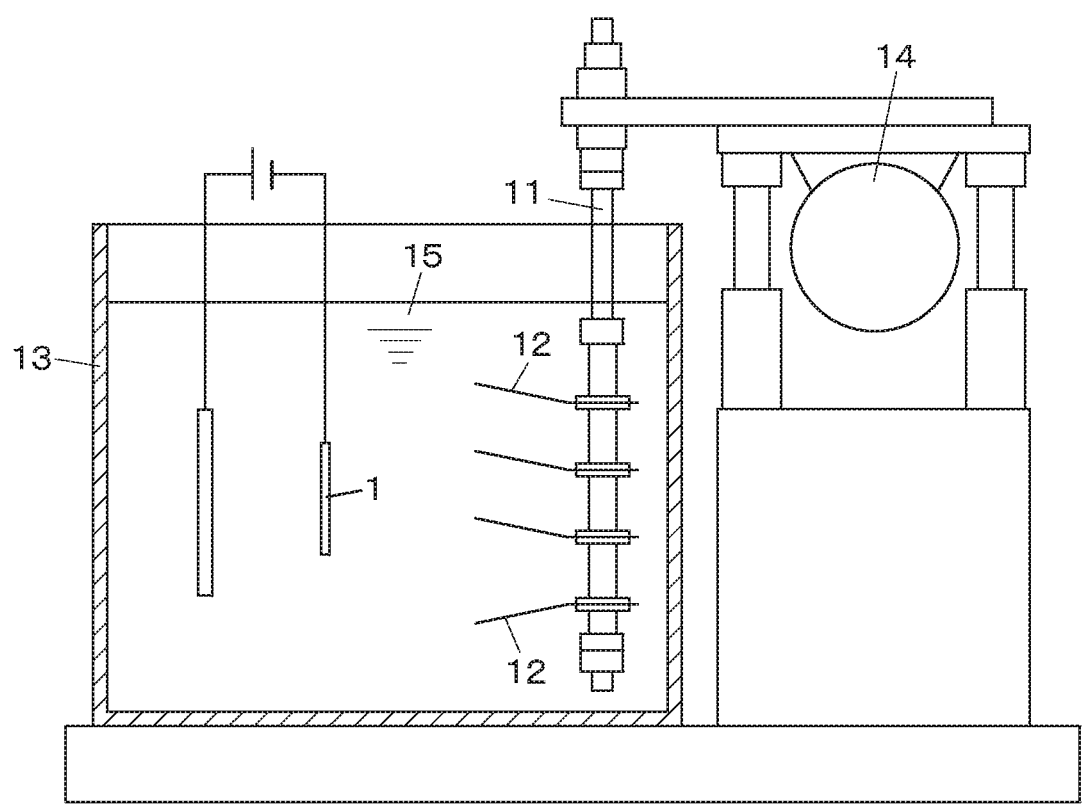

NICKEL PLATED COATING AND METHOD OF MANUFACTURING THE SAME

CROSS REFERENCE TO RELATED APPLICATIONS

This application is a U.S. national stage application of PCT/JP2016/086433 filed on Dec. 7, 2016, and claims priority to Japanese Patent Application No. 2016-035234 filed on Feb. 26, 2016, the disclosures of which are incorporated herein by reference.

TECHNICAL FIELD

The present invention relates to a nickel (Ni) plated coating and a method of manufacturing the same.

BACKGROUND

Ni plated coatings for automobile exterior components require an aesthetically appealing silver appearance, and enhanced corrosion resistance against various corrosive environments. However, when anti-freeze or other corrosive agents are attached on an automobile exterior component and the automobile is in a thermal cycle between subzero outdoor temperatures and warm temperatures in an air-conditioned garage, dissolution and corrosion take place on the Ni pleated coatings, which makes the appearance less attractive.

To prevent such dissolution and corrosion, various modifications have been made on the composition of plating solutions to increase the potential of the Ni plated coatings. To further enhance corrosion resistance, as disclosed in Patent Document 1, microporous corrosion-dispersing nickel is plated on a bright nickel, and chromium is plated thereon.

Patent Documents 2 and 3 disclose techniques of vibrating and agitating a plating bath for controlling the potential difference between Ni plated layers, which is considered to affect corrosion resistance.

Patent Documents

Patent Document 1: Japanese Patent Application Publication No. 2009-74170
Patent Document 2: Japanese Patent Application Publication No. 2005-272858
Patent Document 3: Japanese Patent Application Publication No. 2004-225129

SUMMARY

It is an object of the present invention to provide a method of controlling potential of a plated coating other than the methods of the techniques above, to provide a method of more easily creating various patterns of potential differences in a Ni plated coating, and to provide a Ni plated coating having enhanced corrosion resistance.

The inventors of the present invention have found a method of manufacturing a Ni plated coating having an enhanced corrosive resistance by changing an agitation intensity of a plating bath while a Ni plated layer is being deposited to change the potential in the plated layer. The inventors have further studied the method, and the present invention has been made. Changing the agitation intensity can control the amount of impurities such as carbon and sulfur to be included in the Ni plated coating. It is considered that the content of impurities in the Ni plated coating determines the potential of the Ni plated coating. Changing the agitation intensity can more easily create various patterns of potential differences in the Ni plated coating than a conventional method, by which patterns of potential differences are created by changing the composition of the plating solution. Accordingly, a Ni plated coating with enhanced corrosion resistance can be manufactured.

1. Method of Manufacturing Ni Plated Coating (1) A method of manufacturing a Ni plated coating including at least one Ni plated layer is characterized in that an agitation intensity of a plating bath is changed while the Ni plated layer is being electrodeposited to change potential of the deposited Ni plated layer in a deposition depth direction. The phrase "while the Ni plated layer is being electrodeposited" indicates a time period during which a single layer (or one of a plurality of layers) is being electrodeposited, not indicating a time of changing coatings between one plating layer to another.

(2) A method of manufacturing a Ni plated coating including a bright nickel plated layer (B-Ni plated layer) and a microporous corrosion-dispersing nickel plated layer (D-Ni plated layer) adjoining the B-Ni plated layer is characterized in that an agitation intensity of a plating bath is changed while the D-Ni plated layer is being electrodeposited to change potential of the deposited D-Ni plated layer in a deposition depth direction.

(3) A method of manufacturing a Ni plated coating including a B-Ni plated layer and a D-Ni plated layer adjoining the B-Ni plated layer is characterized in that an agitation intensity of a plating bath is changed while the B-Ni plated layer is being electrodeposited to change potential of the deposited B-Ni plated layer in a deposition depth direction.

With regard to (1) to (3) above, the agitation intensity is preferably increased when a shallow portion in the deposition depth direction is electrodeposited compared to the agitation intensity at which a deeper portion is electrodeposited. With this configuration, the shallow portion exhibits a higher potential than the deeper portion, which causes the corrosive attack to preferentially take place in the deeper portion and thus prevents corrosion in the shallow portion, thereby retarding corrosion on the top surface.

2. Ni Plated Coating (1) A Ni plated coating including a B-Ni plated layer and a D-Ni plated layer adjoining the B-Ni plated layer is characterized in that, other than an interface voltage changing region at an interface between the D-Ni plated layer and the B-Ni plated layer, the D-Ni plated layer has an in-layer voltage changing region in which potential of the D-Ni plated layer is changed in a deposition depth direction at an average rate of 1 mV/0.1 µm or greater (preferably, 1.5 mV/0.1 µm or greater) (a restriction in respect of the upper limit value for the average rate is not necessary).

(2) A Ni plated coating including a B-Ni plated layer and a D-Ni plated layer adjoining the B-Ni plated layer is characterized in that, other than an interface voltage changing region at an interface between the D-Ni plated layer and the B-Ni plated layer, the B-Ni plated layer has an in-layer voltage changing region in which potential of the B-Ni plated layer is changed in a deposition depth direction at an average rate of 1 mV/0.1 µm or greater (a restriction in respect of the upper limit value for the average rate is not necessary).

With regard to (1) and (2) above, in the potential change in the in-layer voltage changing region in the deposition depth direction, the potential preferably increases more at a shallow portion than the potential at a deeper portion. Increase in potential at the shallow portion causes the corrosive attack to preferentially take place in the deeper portion and thus prevents corrosion in the shallow portion, thereby retarding corrosion on the top surface.

The D-Ni plated layer preferably has a deposition thickness of 1 µm to 4 µm. Such a thickness range can provide space for the in-layer voltage changing region.

According to the present invention, various patterns of potential differences can be more easily created in a Ni plated coating than the conventional techniques, and a Ni plated coating having an enhanced corrosion resistance can be provided.

BRIEF DESCRIPTION OF THE DRAWINGS

FIG. 1 is a sectional view of a sample of examples;

FIG. 2 is a schematic view of a test apparatus used in a plating process with vibrating-blade agitation in the examples;

DETAILED DESCRIPTION

[1] Change in Agitation Intensity

Figure 3A:
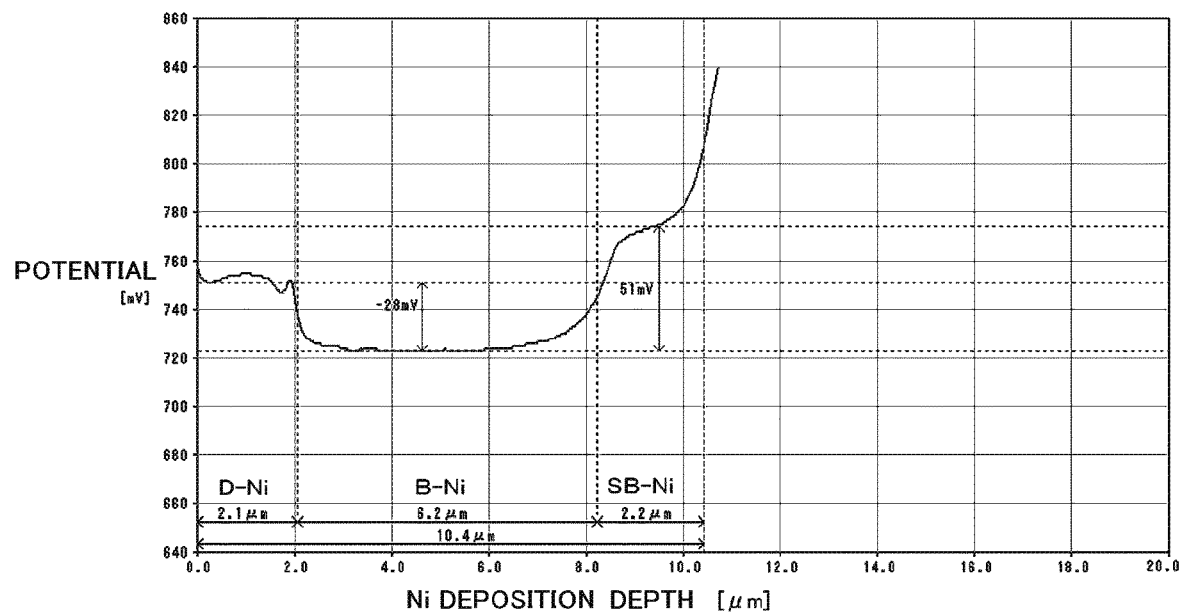
FIG. 3A is a graph illustrating potential of a Ni plated coating.

Examples of the method of changing the agitation intensity include, but not limited to, changing the vibration frequency of vibrating blades for vibrating-blade agitation, changing the rotation rate of rotating blades for rotating-blade agitation, and changing the velocity or amount of air introduced in the plating bath for air agitation.

[2] Ni Plated Coating

The layer configuration of the Ni plated coating is not limited to a particular configuration and may be a single layer coating or a multi-layer coating. If the Ni plated coating is a multi-layer coating, it is preferred that the D-Ni plated layer is deposited on the B-Ni plated layer in terms of corrosion resistance, and it is more preferred that the B-Ni plated layer is deposited on a SB-Ni plated layer, and the D-Ni plated layer is deposited on the B-Ni plated layer in terms of corrosion resistance.

[3] Topcoat on Ni Plated Coating

The topcoat on the Ni plated coating is not limited to a particular coat, and whether the topcoat is formed on the Ni plated coating may be optional. If a topcoat is formed, a chromium (Cr) plated layer is preferred in terms of strength, corrosion resistance, and appearance.

[4] Substrate Below Ni Plated Coating

The substrate onto which the Ni plated coating is deposited is not limited to a particular substrate, and may be any type of substrate such as a resin or metal substrate. When the substrate is a non-conductive substrate such as resin, a conductive layer is formed that is necessary for electrodeposition.

[5] Applications of Ni Plated Coating

Examples of applications of the Ni plated coating include plated coatings for automobile exterior components (e.g., radiator grille, fender, garnish, hub caps, rear panel, air spoiler, emblem) and for housings of electrical products (e.g., mobile phone, smart phone, mobile information terminal, game console). In particular, automobile exterior components, which are exposed to the weather, require good corrosion resistance, and thus the present invention is advantageous when applied to automobile exterior components.

EXAMPLES

As illustrated in FIG. 1, on a brass plate (60×100 mm) as a substrate 1, a SB-Ni plated layer 2, a B-Ni plated layer 3, and a D-Ni plated layer 4, which are collectively referred to as a "Ni plated coating", were electrodeposited in this order, and then a Cr plated layer 5 was electrodeposited on the D-Ni plated layer 4 to create samples of Comparative Examples 1 and 2, and Examples 1 to 3. Details are described below.

1. Deposition of Ni Plated Coating

The SB-Ni plated layer, the B-Ni plated layer, and the D-Ni plated layer were each deposited in a plating bath having a composition (aqueous solution) and under plating conditions illustrated in the following Tables 1 and 2. With regard to the agitation method of the plating bath among the plating conditions, different agitation methods illustrated in Table 2 were used for Comparative Examples 1 and 2, and Examples 1 to 3. The composition of the plating bath for each plated layer is not limited to the composition illustrated in Table 1, and may be any composition as long as it is suitable for each plated layer. The plating conditions of each plated layer may be modified as appropriate without departing from the scope of the present invention.

TABLE 1

| | | 3<br>D-Ni plated layer | ←2<br>B-Ni plated layer | ←1 Deposition order<br>SB-Ni plated layer |
|---|---|---|---|---|
| Composition of<br>Plating bath | Nickel sulfate (g/L) | 280 | 280 | 280 |
| | Nickel chloride (g/L) | 50 | 50 | 50 |
| | Boric acid (g/L) | 40 | 40 | 40 |
| | Brightener:<br>Formaldehyde (37%) (g/L) | — | — | 10 |
| | First class brightener:<br>Saccharin (g/L) | 1.5 | 1.5 | — |
| | Second class brightener:<br>1,4-Butynediol (g/L) | 0.2 | 0.2 | — |

TABLE 1-continued

|  |  | 3<br>D-Ni plated layer | ←2<br>B-Ni plated layer | ←1 Deposition order<br>SB-Ni plated layer |
|---|---|---|---|---|
|  | Anti-pitting agent:<br>Sodium lauryl sulfate (g/L) | — | 0.2 | 0.2 |
|  | Potential modifier:<br>Chloral hydrate | Added as appropriate<br>in accordance with<br>potential difference | — | — |
|  | Particles:<br>$TiO_2$, $ZnO$, $SiO_2$, $Al_2O_3$ | Added as appropriate<br>in accordance with<br>porous density | — | — |
| Plating<br>condition | Bath temperature (° C.) | 55 | 55 | 55 |
|  | Current density (A/dm$^2$) | 4 | 5 | 5 |
|  | Agitation method |  | See Table 2 |  |
|  | Plated layer thickness (μm) |  | See Table 2 |  |

TABLE 2

|  |  | 3<br>D-Ni plated layer | ←2<br>B-Ni plated layer | ←1 Deposition order<br>SB-Ni plated layer |
|---|---|---|---|---|
| Comparative Example 1 | Agitation method | Air agitation | Air agitation | Air agitation |
|  | Deposition thickness (μm) | 2.1 | 6.2 | 2.2 |
| Comparative Example 2 | Agitation method | Vibrating-blade agitation<br>Constant at 40 Hz | Air agitation | Air agitation |
|  | Deposition thickness (μm) | 2.2 | 8.2 | 2.3 |
| Example 1 | Agitation method | Vibrating-blade agitation<br>Continuously changed<br>from 0 to 40 Hz | Air agitation | Air agitation |
|  | Deposition thickness (μm) | 2.3 | 7.1 | 3.7 |
| Example 2 | Agitation method | Vibrating-blade agitation<br>Changed stepwise<br>from 20 to 40 Hz | Air agitation | Air agitation |
|  | Deposition thickness (μm) | 2.2 | 7.1 | 3.2 |
| Example 3 | Agitation method | Air agitation | Changed stepwise<br>from air agitation to<br>vibrating-blade agitation<br>at 40 Hz | Air agitation |
|  | Deposition thickness (μm) | 1.9 | 4.9 | 2.2 |

In Table 2, "air agitation" means agitation by air introduced in the plating bath. "Vibrating-blade agitation" was performed by using a test apparatus the product name of which was "table-top ultra-vibrating α-1 stirrer" made by Japan Techno Co., Ltd., which is illustrated in FIG. 2. The test apparatus included a plurality of blades 12 mounted in a shaft 11 in different height levels, and is disposed in a processing tank 13 having internal dimensions of 200×300× 290 mm. A vibration generator 14 vibrated the shaft 11 at vibration frequencies ranging from 0 Hz to 40 Hz. Accordingly, the blades 12 were vibrated with the shaft 11 and a plating bath 15 in the processing tank was agitated (vibrating-blade agitation) to make three-dimensional turbulent flow. The agitation intensity increases with the vibration frequency.

In Comparative Example 1, the D-Ni plated layer was deposited with air agitation.

In Comparative Example 2, the D-Ni plated layer was deposited with vibrating-blade agitation at a constant vibration frequency of 40 Hz from the start to the end of the deposition.

In Example 1, the D-Ni plated layer was deposited with vibrating-blade agitation at continuously changing vibration frequencies from 0 Hz to 40 Hz at a rate of 0.2 Hz/sec to 0.4 Hz/sec (agitation intensity was continuously changed) from the start to the end of the deposition.

In Example 2, the D-Ni plated layer was deposited with vibrating-blade agitation at a vibration frequency of 20 Hz for one minute from the start of the deposition and then at 40 Hz until the end of the deposition (agitation intensity was changed stepwise).

In Example 3, the B-Ni plated layer was deposited with air agitation for two and a half minutes from the start of the deposition and then with vibrating-blade agitation at a vibration frequency of 40 Hz until the end of the deposition (agitation intensity was changed stepwise).

2. Deposition of Cr Plated Layer and Chromate Treatment

The same Cr plated layers were deposited on the samples of Comparative Examples 1 and 2 and Examples 1 to 3, and chromate treatment was performed thereon. The Cr plated layer was electrodeposited in a trivalent chrome plating bath including an aqueous solution of Twilite, a product of MacDermid Performance Solutions Japan K. K. for salt-resistant, dark chrome topcoat. The plating conditions were as follows: the bath temperature of 50° C., current density of 10 A/dm$^2$, no agitation, and the plated layer thickness of 0.3 μm. The chromate treatment was performed by using acidic, electrolytic chromate (chromic acid 30 g/L).

3. Measurement of Potential of Ni Plated Coating

Potentials of the Ni plated coating of the samples created in Comparative Examples 1 and 2, and Examples 1 to 3 were measured from the top surface of the D-Ni plated layer in the deposition depth direction. The following describes the measurement results of the layers in the inverse deposition depth direction, that is, in the order of deposition.

The Ni plated coating of Comparative Example 1 had an interface voltage changing region, as illustrated in FIG. 3A, in which the potential dropped by 51 mV at the interface between the SB-Ni plated layer and the B-Ni plated layer. The Ni plated coating of Comparative Example 1 also had an interface voltage changing region in which, in the B-Ni plated layer, the potential substantially leveled off, and then increased by 28 mV at the interface between the B-Ni plated layer and the D-Ni plated layer. The Ni plated coating of Comparative Example 1 also had an interface voltage changing region, in which, in the D-Ni plated layer, the potential substantially leveled off, and then slightly increased at the top surface of the D-Ni plated layer (interface between the D-Ni plated layer and Cr plated layer).

Figure 4A:
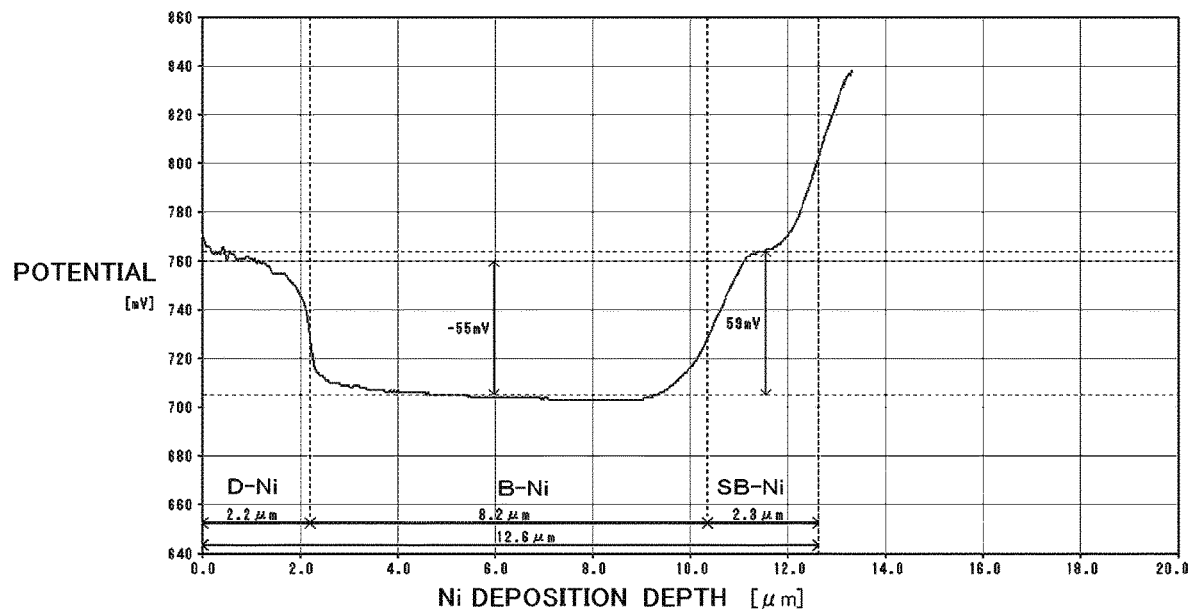
FIG. 4A is a graph illustrating potential of a Ni plated coating.

The Ni plated coating of Comparative Example 2 had an interface voltage changing region, as illustrated in FIG. 4A, in which the potential dropped by 59 mV at the interface between the SB-Ni plated layer and the B-Ni plated layer. The Ni plated coating of Comparative Example 2 also had an interface voltage changing region in which, in the B-Ni plated layer, the potential substantially leveled off, and then increased by 55 mV at the interface between the B-Ni plated layer and the D-Ni plated layer. The Ni plated coating of Comparative Example 2 also had an interface voltage changing region in which, in the D-Ni plated layer, the potential substantially leveled off, and then slightly increased at the top surface of the D-Ni plated layer (interface between the D-Ni plated layer and Cr plated layer).

Figure 5A:
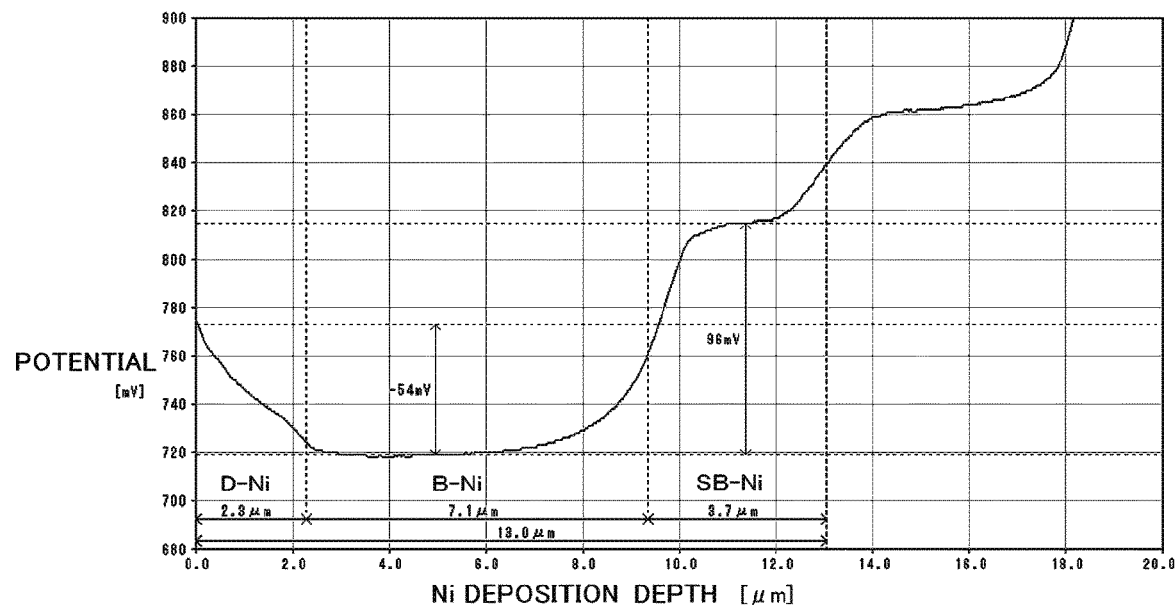
FIG. 5A is a graph illustrating potential of a Ni plated coating.

The Ni plated coating of Example 1 had an interface voltage changing region, as illustrated in FIG. 5A, in which the potential dropped by 96 mV at the interface between the SB-Ni plated layer and the B-Ni plated layer. The Ni plated coating of Example 1 also had an interface voltage changing region and an in-layer voltage changing region in which, in the B-Ni plated layer, the potential substantially leveled off, and then gradually and continuously increased by 54 mV from the interface between the B-Ni plated layer and the D-Ni plated layer into the D-Ni plated layer (although the interface between the interface voltage changing region and the in-layer voltage changing region was obscure, the rate of change in the in-layer voltage changing region varied in a range of 1.4 mV/0.1 µm to 2.6 mV/0.1 µm, and the average rate is estimated to be about 1.9 mV/0.1 µm). The Ni plated coating of Example 1 also had an interface voltage changing region in which the potential slightly increased at the top surface of the D-Ni plated layer (interface between the D-Ni plated layer and Cr plated layer). The potential difference between the highest potential in the D-Ni plated layer (except the potential in the interface voltage changing region between the D-Ni plated layer and the Cr plated layer) and the lowest potential in the B-Ni plated layer (except the potential in the interface voltage changing region) was 44 mV. It is considered that the in-layer voltage changing region was created due to the change in agitation intensity in the deposition process of the D-Ni plated layer by continuously changing the vibration frequency of the vibrating-blade agitation.

Figure 6:
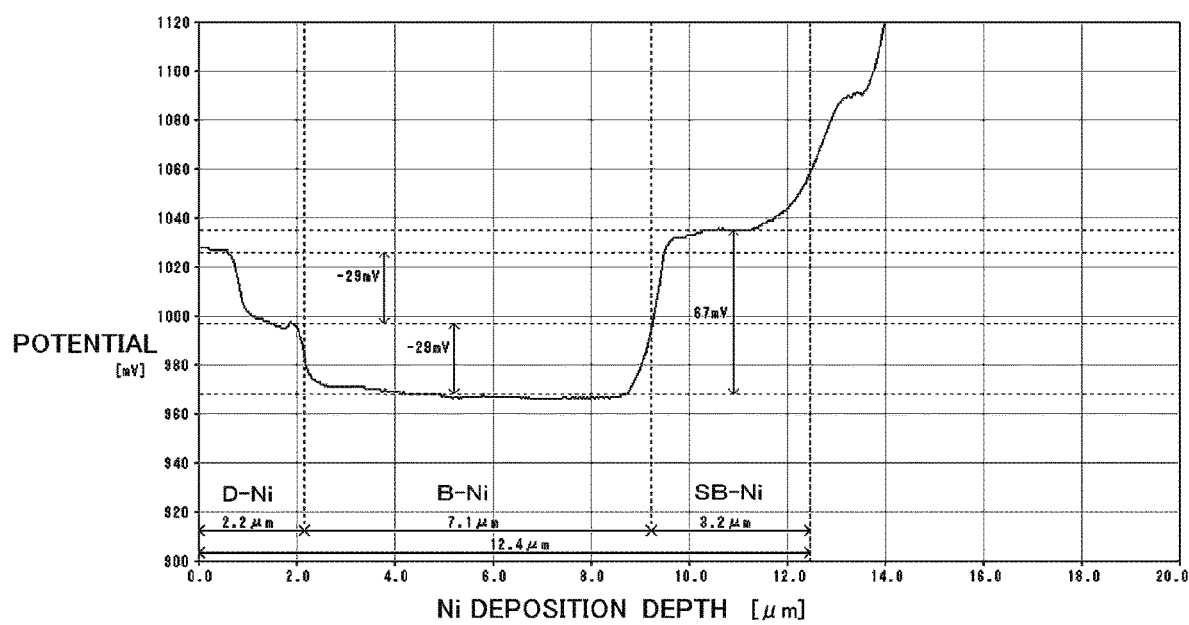
FIG. 6 is a graph illustrating potential of a Ni plated coating in Example 2.

The Ni plated coating of Example 2 had an interface voltage changing region, as illustrated in FIG. 6, in which the potential dropped by 67 mV at the interface between the SB-Ni plated layer and the B-Ni plated layer. The Ni plated coating of Example 2 also had an interface voltage changing region in which, in the B-Ni plated layer, the potential substantially leveled off, and then increased by 29 mV at the interface between the B-Ni plated layer and the D-Ni plated layer. The Ni plated coating of Example 2 also had an in-layer voltage changing region in which the potential increased by 29 mV in the D-Ni plated layer (the rate of change varied in a range of 8 mV/0.1 µm to 12 mV/0.1 µm, and the average rate was about 10 mV/0.1 µm). The Ni plated coating of Example 2 also had an interface voltage changing region in which the potential slightly increased at the top surface of the D-Ni plated layer (interface between the D-Ni plated layer and Cr plated layer). The potential difference between the highest potential in the D-Ni plated layer (except the potential in the interface voltage changing region between the D-Ni plated layer and the Cr plated layer) and the lowest potential in the B-Ni plated layer (except the potential in the interface voltage changing region) was 58 mV. It is considered that the in-layer voltage changing region was created due to the change in agitation intensity in the deposition process of the D-Ni plated layer by changing the vibration frequency of the vibrating-blade agitation stepwise.

Figure 7:
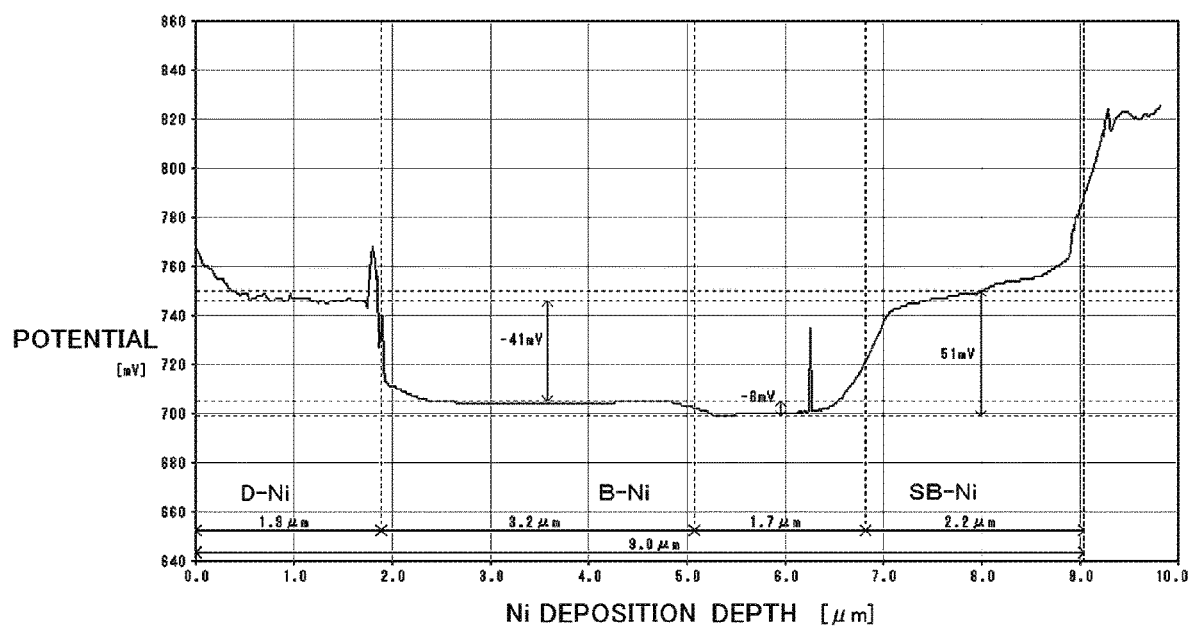
FIG. 7 is a graph illustrating potential of a Ni plated coating in Example 3.

The Ni plated coating of Example 3 had an interface voltage changing region, as illustrated in FIG. 7, in which the potential dropped by 51 mV at the interface between the SB-Ni plated layer and the B-Ni plated layer. The Ni plated coating of Example 3 also had an in-layer voltage changing region in which, in the B-Ni plated layer, the potential substantially leveled off and then increased by 6 mV (average rate of change was 1.4 mV/0.1 µm). The Ni plated coating of Example 3 also had an interface voltage changing region in which, in the B-Ni plated layer, the potential substantially leveled off again, and then increased by 41 mV at the interface between the B-Ni plated layer and the D-Ni plated layer. The Ni plated coating of Example 3 also had an interface voltage changing region in which, in the D-Ni plated layer, the potential substantially leveled off, and then slightly increased at the top surface of the D-Ni plated layer (interface between the D-Ni plated layer and Cr plated layer). The potential difference between the highest potential in the D-Ni plated layer (except the potential in the interface voltage changing region) and the lowest potential in the B-Ni plated layer (except the potential in the interface voltage changing region) was 47 mV. It is considered that the in-layer voltage changing region was created due to the change in agitation intensity in the deposition process of the B-Ni plated layer by changing the vibration frequency of the vibrating-blade agitation stepwise.

4. Corrosion Test

The created samples of Examples 1 to 3 and Comparative Examples 1 and 2 were subjected to a Corrodkote test specified in JIS H 8502 under the test conditions of temperature of 38° C., humidity of 90%, and test hours of 16 hours for four cycles.

After the Corrodkote test, the samples were taken out and washed with water and dried. An optical micrograph (magnification of 500×) of the sample surface and a scanning electron micrograph (magnification of 10000×) of a section of a corroded portion were captured. The corroded state of the surface was checked with a rating number standard chart attached to JIS Z 2371 and a rating number was determined.

Figure 3B:
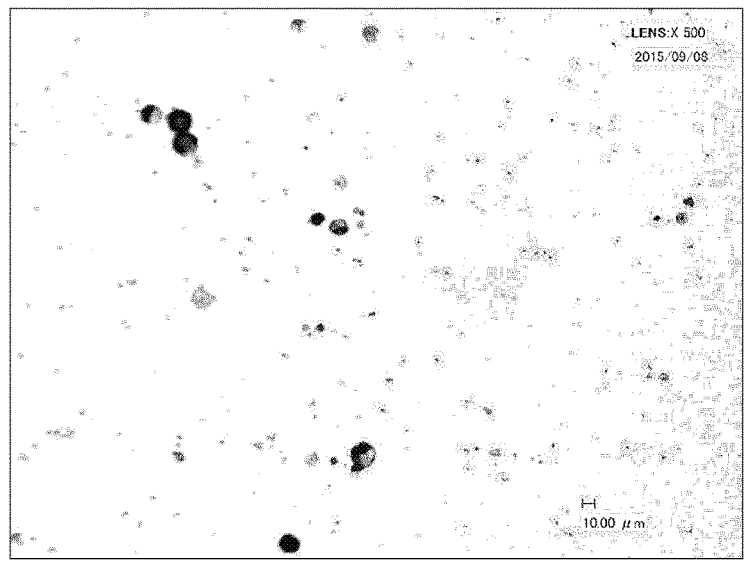
FIG. 3B is an optical micrograph of a sample surface.
Figure 3C:
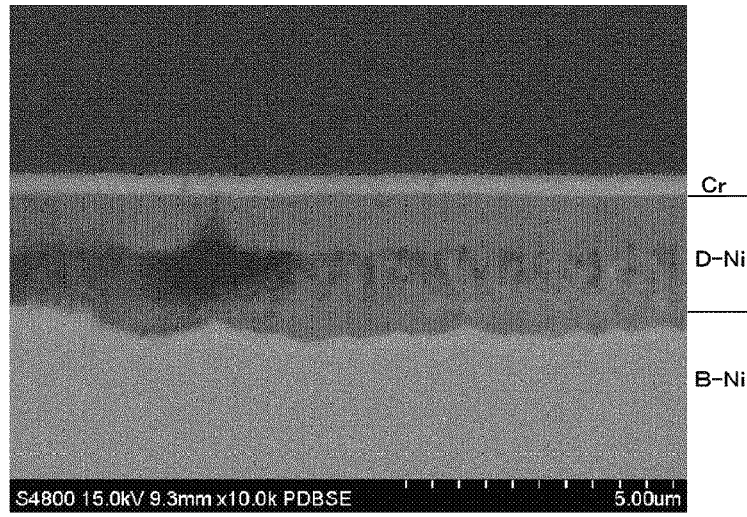
FIG. 3C is a scanning electron micrograph of a section of a corroded portion in Comparative Example 1.

In Comparative Example 1, pinholes were observed on the sample surface as depicted in the optical micrograph illustrated in FIG. 3B, and corrosion spread in the D-Ni plated layer as depicted in the scanning electron micrograph illustrated in FIG. 3C. The rating number was 8.

Figure 4B:
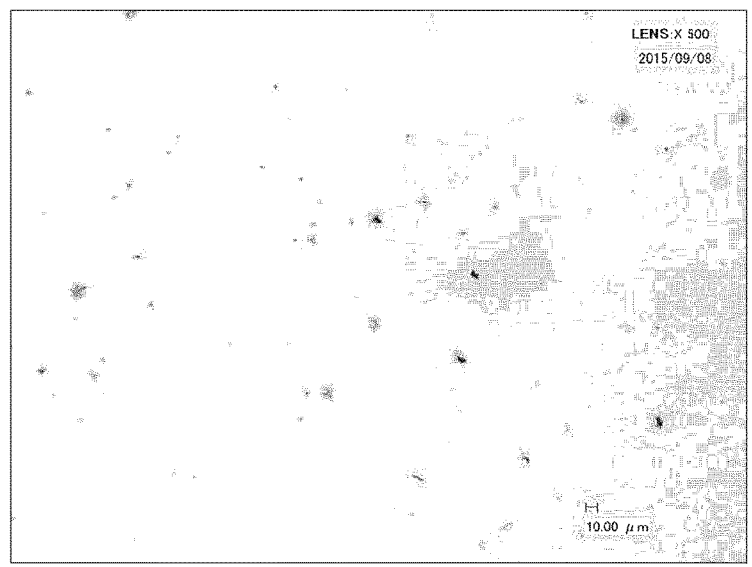
FIG. 4B is an optical micrograph of a sample surface.
Figure 4C:
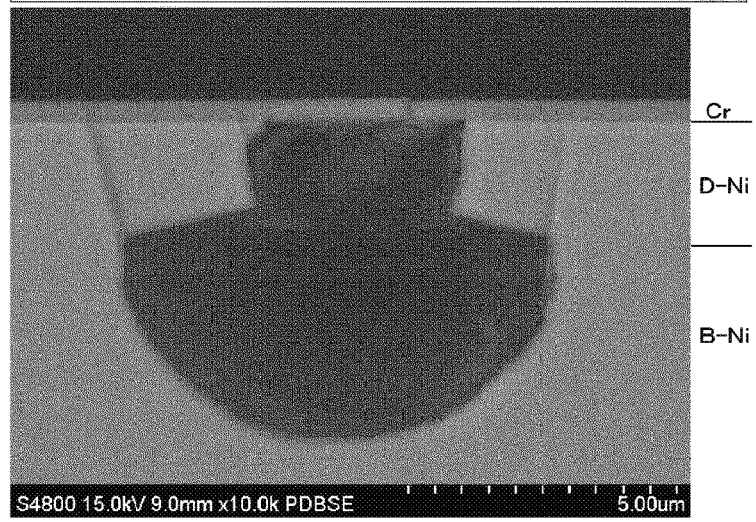
FIG. 4C is a scanning electron micrograph of a section of a corroded portion in Comparative Example 2.

In Comparative Example 2, pinholes on the sample surface were not noticeable as depicted in the optical micrograph illustrated in FIG. 4B. As depicted in the scanning electron micrograph illustrated in FIG. 4C, corrosion spread in the B-Ni plated layer but corrosion in the D-Ni plated layer was small at every level in the deposition thickness direction. The rating number was 9.

Figure 5B:
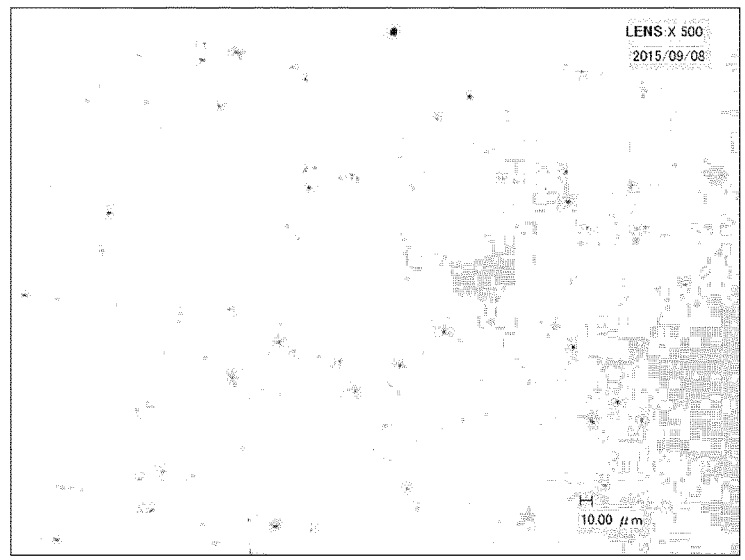
FIG. 5B is an optical micrograph of a sample surface.
Figure 5C:
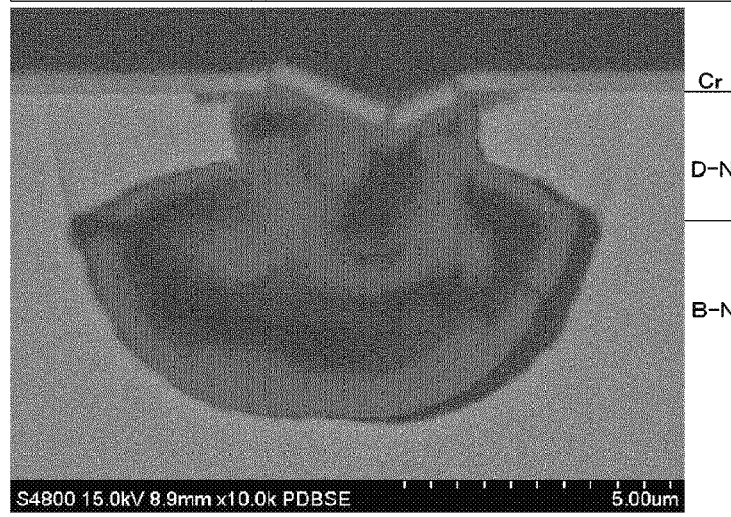
FIG. 5C is a scanning electron micrograph of a section of a corroded portion in Example 1.

In Example 1, pinholes on the sample surface were not noticeable as depicted in the optical micrograph illustrated in FIG. 5B. As depicted in the scanning electron micrograph illustrated in FIG. 5C, corrosion spread in the B-Ni plated layer, but in the D-Ni plated layer, a smaller corrosion was observed as directing from a deeper portion in the deposition thickness direction to a shallow portion. The rating number was 9.

The test result of Example 2 was substantially the same as that of Example 1. Pinholes on the sample surface were not noticeable. Corrosion spread in the B-Ni plated layer, but in the D-Ni plated layer, a smaller corrosion was observed as directing from a deeper portion in the deposition thickness direction to a shallow portion. The rating number was 9.

In Example 3, although the rating number was 8, a smaller corroded region was observed than in Comparative Example 1.

The present invention is not limited to the examples described above, and may be modified as appropriate and embodied without departing from the scope of the present invention.

The invention claimed is:

1. A nickel-plated coating deposited on a substrate comprising:
    a bright nickel-plated layer; and
    a microporous, corrosion-dispersing nickel-plated layer adjoining the bright nickel-plated layer, the nickel-plated coating being characterized in that,
    other than an interface voltage changing region at an interface between the corrosion-dispersing nickel-plated layer and the bright nickel-plated layer and an interface of the corrosion-dispersing nickel-plated layer opposite the bright nickel-plated layer, the corrosion-dispersing nickel-plated layer has an in-layer voltage changing region in which potential of the corrosion-dispersing nickel-plated layer is changed in a deposition depth direction from an inner surface of the nickel-plated coating at an average rate of 1 mV/0.1 μm or greater.

2. A nickel-plated coating deposited on a substrate comprising:
    a bright nickel-plated layer; and
    a microporous corrosion-dispersing nickel-plated layer adjoining the bright nickel-plated layer, the nickel-plated coating being characterized in that,
    other than an interface voltage changing region at an interface between the corrosion-dispersing nickel-plated layer and the bright nickel-plated layer, the bright nickel-plated layer has an in-layer voltage changing region in which potential of the bright nickel-plated layer is decreased in a deposition depth direction from an outer surface of the nickel-plated coating at an average rate of 1 mV/0.1 μm or greater.

3. The nickel: plated coating according to claim 1, wherein, in the potential change in the in-layer voltage changing region in the deposition depth direction relative to an outer surface of the nickel-plated coating, the potential is higher at a shallow portion than the potential at a deeper portion.

4. The nickel-plated coating according to claim 1, wherein the corrosion-dispersing nickel-plated layer has a deposition thickness of 1 μm to 4 μm.

5. The nickel-plated coating according to claim 2, wherein, in the potential change in the in-layer voltage changing region in the deposition depth direction relative to the outer surface of the nickel-plated coating, the potential is higher at a shallow portion than the potential at a deeper portion.

* * * * *